(12) United States Patent
Snyder (10) Patent No.: US 10,044,735 B2
(45) Date of Patent: Aug. 7, 2018

(54) SYSTEM AND METHOD FOR AUTHENTICATION OF ELECTRONIC COMMUNICATIONS

(71) Applicant: Secure Information Devices Inc., Beaver, PA (US)

(72) Inventor: John B. Snyder, Pittsburgh, PA (US)

(73) Assignee: SECURE INFORMATION DEVICES INC., Beaver, PA (US)

( * ) Notice: Subject to any disclaimer, the term of this patent is extended or adjusted under 35 U.S.C. 154(b) by 195 days.

(21) Appl. No.: 15/093,223

(22) Filed: Apr. 7, 2016

(65) Prior Publication Data

US 2016/0301701 A1    Oct. 13, 2016

Related U.S. Application Data

(60) Provisional application No. 62/145,387, filed on Apr. 9, 2015.

(51) Int. Cl.
   *H04L 29/06*    (2006.01)

(52) U.S. Cl.
   CPC ............ *H04L 63/123* (2013.01); *H04L 63/08* (2013.01)

(58) Field of Classification Search
   CPC .................................................. H04L 63/123
   See application file for complete search history.

(56) References Cited

U.S. PATENT DOCUMENTS

| 7,921,456 | B2 * | 4/2011 | Chua | H04L 63/0807 |
| | | | | 709/217 |
| 2005/0246420 | A1 * | 11/2005 | Little, II | G06Q 10/107 |
| | | | | 709/204 |
| 2009/0187493 | A1 * | 7/2009 | Whiteman | G06Q 10/04 |
| | | | | 705/28 |

FOREIGN PATENT DOCUMENTS

CA    2390817 A1 * 12/2003 ......... H04L 63/0281

* cited by examiner

*Primary Examiner* — Shawnchoy Rahman
(74) *Attorney, Agent, or Firm* — Leason Ellis LLP (57) ABSTRACT

A system and method is disclosed for validating the authenticity of communications between users using message transmission systems. The system is configured to be independent of the message transmission system and is configured to determine a verification status associated with the message sender, the message recipients, or both. Based on the assigned verification status, the system generates notifications which are transmitted to at least one of the parties to the message, depending on the verification status, thereby providing a representation of the authenticity of the message. In certain embodiments, the system is configured to prompt user actions to be taken at remote devices, such as mobile phones and computers based on the verification statuses.

28 Claims, 4 Drawing Sheets

SYSTEM AND METHOD FOR AUTHENTICATION OF ELECTRONIC COMMUNICATIONS

TECHNICAL FIELD OF THE DISCLOSURE

This patent application relates generally to the field of electronic communications, and more particularly to validating the authenticity of communications between users over message transmission systems.

BACKGROUND OF THE DISCLOSURE

Electronic messages including e-mail, text message (e.g., SMS) and the like, are used on a daily basis to conduct personal and business affairs. Accordingly, such means of communications are commonly accepted as trustworthy communications from the senders. However, electronic communications are generally not secure and are subject to misuse by individuals attempting to commit fraud. For instance, techniques referred to as "phishing" are employed to acquire sensitive information such as usernames, passwords, and credit card details (and sometimes, indirectly, money) by masquerading as a trustworthy entity in an electronic communication. By way of further example, fraudsters commonly spoof an electronic address (e.g., an e-mail address or telephone number) associated with a trusted individual to transmit harmful malware to the recipient or otherwise induce the recipient to perform some action that was not endorsed by the trusted individual.

Accordingly, it is desirable to provide a system and method for validating the authenticity of electronic communications between users. Furthermore, it is desirable to provide a system that performs such monitoring independently of the electronic message transmission systems used to perpetrate fraud. It is also desirable to have a system that provides message recipients notifications as to the authenticity of the messages and provides information concerning the trustworthiness of the message source. Similarly, it is desirable to have a system that provides the sending user notifications regarding the messages transmitted using the user's electronic address, so as to prevent fraudulent use.

It is with respect to these and other considerations that the disclosure made herein is presented.

SUMMARY OF CERTAIN EMBODIMENTS OF THE DISCLOSURE

According to a first aspect, a computer implemented method is provided for validating the authenticity of communications between users over a first message transmission system. In particular, each communication includes a message, a sender electronic address, and a recipient electronic address and is sent from a sending computing device associated with a sending user and is addressed to the recipient electronic address of a recipient user. The method includes providing a message verification application, that is independent of the first message transmission system, to respective computing devices associated with one or more of the sending user, the recipient user, or both. The method further includes, receiving at a centralized computing device that includes include a storage medium having instructions stored therein and a processor configured by executing the instructions, a copy of a communication from the first message transmission system. The method also includes verifying, by the computing device and independent of the message transmission system, whether the sending user, the recipient user, or both are among a particular set of trusted users. Verifying is performed by testing the sender electronic address, the recipient electronic address, or both for a match with at least one of a plurality of electronic addresses stored in a database of electronic addresses associated with respective trusted users, and assigning a verified status to the sending user, the recipient user, or both in response to the testing step resulting in the match, The method also includes generating, by the computing device, one or more notifications for transmission via the message verification application. The one or more notifications can comprise one or more notification types including: a first type that is generated for transmission to at least the recipient user in response to the sending user being assigned the verified status; a second type that is generated for transmission to at least the sending user in response to the recipient user being assigned the verified status; a third type that is generated for transmission to at least the recipient user in response to the sending user and the recipient user both being assigned the verified status, wherein the third type of notification identifies at least the sending user being assigned the verified status; and a fourth type that is generated for transmission to at least the recipient user in response to the verified status not being assigned to the recipient user. The method also includes transmitting the one or more notifications from the centralized computing device to at least one of the respective computing devices associated with the sending user, the recipient user, or both.

According to a further aspect, the notification can be provided to the sending user, the recipient user, or both in association with the communication. According to a further aspect, the one or more notification can cause the message verification application to provide the one or more notifications to the sending user, the recipient user or both in association with the communication. According to a further aspect, the messaging message verification application causes a message transmission client application of the first message transmission system to provide the one or more notifications to the sending user, the recipient user or both.

These and other aspects, features, and advantages can be appreciated from the accompanying description of certain embodiments of the disclosure and the accompanying drawing figures and claims.

DETAILED DESCRIPTION OF CERTAIN EMBODIMENTS OF THE DISCLOSURE

By way of overview and introduction, various systems and methods are described herein that facilitate and enable validating the authenticity of communications between users over a message transmission system. The systems and methods have the end goal of preventing use of electronic message transmission systems, such as e-mail, text messaging and other such electronic communication systems, to commit fraud. In particular, the system verifies the authenticity of messages transmitted via the message transmission systems and informs one or more of the parties to the message (e.g., the sender and/or recipients) whether the message was transmitted by, or to, trusted users.

Message validation is performed using a message verification system that is preferably independent of the primary message transmission system. More specifically, the independent message verification system is configured to receive a copy of the message transmitted via the message transmission system. The message verification system also includes a verification component for verifying whether the parties to the message are trusted users and assigning a verified status to the users accordingly. In this manner, the system can be configured to identify users and assign one or more verified statuses representing varying degrees of trust in the particular user's electronic address, such as: a) "registered" status for users that have enrolled with the system and therefore have established a baseline level of trust; b) "trusted" status for uses whose identities have been additionally verified by the system during registration and therefore have established a higher trust-level. In addition, the verification component can also assign a status to users that are unknown to the system, for instance, an "untrusted" status; however, it can be appreciated that untrusted users can simply not be assigned a verification status at all. The system also includes a messaging component that is configured to generate notifications that indicate the assigned status of one or more of the parties to the message and transmit the notifications to one or more of the sender, the recipient(s) or a combination of the foregoing.

The referenced systems and methods are now described more fully with reference to the accompanying drawings, in which one or more illustrated embodiments and/or arrangements of the systems and methods are shown. The systems and methods are not limited in any way to the illustrated embodiments and/or arrangements as the illustrated embodiments and/or arrangements described below are merely exemplary of the systems and methods, which can be embodied in various forms, as appreciated by one skilled in the art. Therefore, it is to be understood that any structural and functional details disclosed herein are not to be interpreted as limiting the systems and methods, but rather, are provided as a representative embodiment and/or arrangement for teaching one skilled in the art one or more ways to implement the systems and methods. Accordingly, aspects of the present systems and methods can take the form of an entirely hardware embodiment, an entirely software embodiment (including firmware, resident software, micro-code, etc.), or an embodiment combining software and hardware. One of skill in the art can appreciate that aspects described as a software process can be transformed into an equivalent hardware structure, and a hardware structure can itself be transformed into an equivalent software process. Thus, the selection of a hardware implementation versus a software implementation for one or more of the aspects is one of design choice and left to the implementer. Furthermore, the terms and phrases used herein are not intended to be limiting, but rather, are to provide an understandable description of the systems and methods.

Figure 1:
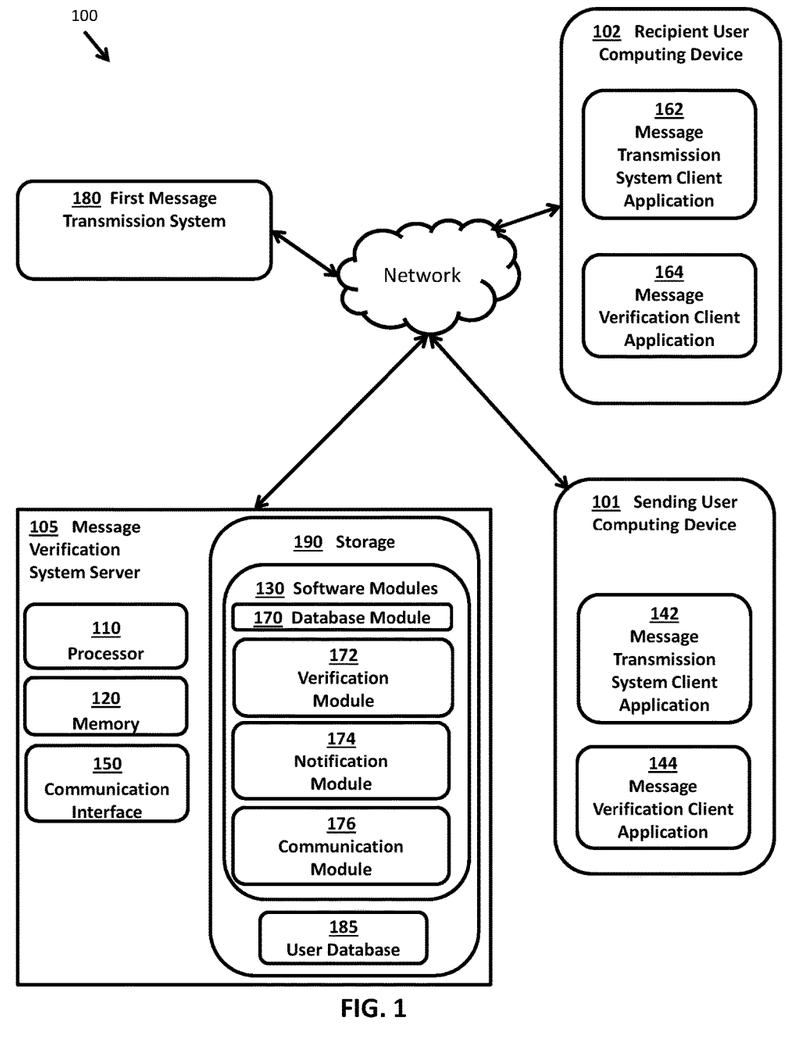
FIG. 1 is a high-level diagram illustrating an exemplary configuration of a system for validating the authenticity of communications between users over a message transmission system in accordance with at least one embodiment disclosed herein.

An exemplary system is shown as a block diagram in FIG. 1 which is a high-level diagram illustrating one configuration of the system for validating the authenticity of communications between users 100. In this arrangement, the system 100 consists of a message authentication system server 105 (referred to herein as the system server). Also shown are remote computing devices in communication with the system server 105 including a sending user computing device 101 (referred to herein as the sender device) and a recipient user computing device 102 (referred to herein as the recipient device). The sender device 101, and recipient device 102 are associated with a sender and recipient user, respectively (not shown). In addition, the sender and recipient user computing devices are in communication with a first message transmission system 180.

The message transmission system 180 is intended to represent various forms of digital computing devices and/or data processing apparatus that are configured to coordinate transmission of electronic messages between sending user device 101 and recipient user device 102. For example and without limitation, the message transmission system can be one or more cloud based servers that coordinate transmission of e-mail, text messages, electronic chat messages and the like between users. It would be understood by those skilled in the art that the users that are using respective computing devices to transmit and receive messages via the message transmission system have respective messaging accounts with associated electronic address(es) (e.g., telephone number, e-mail address, chat ID, etc.).

The system server 105 is intended to represent various forms of digital computing devices and/or data processing apparatus such as servers, blade servers, mainframes, and other appropriate computers and/or networked or cloud based computing systems that are capable of communicating with remote computing devices, data storage devices and computing networks, receiving, transmitting and storing electronic information and processing information as further described herein.

Sender device 101 and recipient device 102, are intended to represent various computing devices and/or data processing apparatuses, including, but not limited to, personal computers, tablet computers and smart phone devices. Sender device 101 and recipient device 102 can be configured to collect information from respective users, communicate the information to remote computing devices (e.g., system server 105, message transmission system 180) and receive information from the remote computing devices and display the information to respective users.

As shown, the sender and recipient devices can be executing one or more client applications, including a message transmission client application (142 and 162, respectively). The first message transmission client application is a software application comprising instructions in the form of code that, when executed by the device processor (not shown), configures the device to transmit messages to other users via the first message transmission system 180. For example and without limitation, the first message transmission application can be an e-mail application such as a Microsoft Outlook e-mail client application by Microsoft Corp. of Redmond, Wash. Although the message transmission client applications are discussed herein as a stand-alone software application executing on respective user devices, it can be appreciated that the application can be executing on one or more remote server devices that are accessible by the user devices over a network, for instance, a cloud based e-mail application that is accessed by the user device through a web browser.

Similarly, as shown, the sender and recipient devices can also be executing a message verification client application (144 and 164, respectively). The message verification client application is configured to interface with the message transmission client application executing on the user device and the remote system server 105. More specifically, the message verification client application is a software application comprising instructions in the form of code, which when executed by the device processor (not shown), configures the device to receive and process information concerning respective users, and messages that are being transmitted and/or received using the message transmission client application, and provide the information to the system server in accordance with the exemplary methods for validating the authenticity of communications between users as further described herein. In addition, the message verification client application configures the respective user devices to output information received from the message verification system server 105 to respective users.

The system server 105 is arranged with various hardware and software components that serve to enable operation of the system for validating the authenticity of communications between users 100, including a processor 110, a memory 120, storage 190 and a communication interface 150. The processor 110 serves to execute software instructions that can be loaded into the memory 120. The processor 110 can be a number of processors, a multi-processor core, or some other type of processor, depending on the particular implementation.

Preferably, the memory 120 and/or the storage 190 are accessible by the processor 110, thereby enabling the processor 110 to receive and execute instructions stored on the memory 120 and/or on the storage 190. The memory 120 can be, for example, a random access memory (RAM) or any other suitable volatile or non-volatile computer readable storage medium. In addition, the memory 120 can be fixed or removable. The storage 190 can take various forms, depending on the particular implementation. For example, the storage 190 can contain one or more components or devices such as a hard drive, a flash memory, a rewritable optical disk, a rewritable magnetic tape, or some combination of the above. The storage 190 also can be fixed or removable or remote such as cloud based data storage systems.

The one or more software modules 130 are encoded in the storage 190 and/or in the memory 120. The software modules 130 can comprise one or more software programs or applications having computer program code or a set of instructions executed in the processor 110. Such computer program code or instructions for carrying out operations for aspects of the systems and methods disclosed herein can be written in any combination of one or more programming languages. The program code can execute entirely on the system server 105, partly on the system server 105, as a stand-alone software package, partly on the system server 105 and partly on a remote computer/device such as the sender device 101, the recipient device 102, the first message transmission system 180 or entirely on the remote computers/devices. In the latter scenario, the remote computer systems can be connected to the system server 105 through any type of network, including a local area network (LAN) or a wide area network (WAN), or the connection can be made to an external computer (for example, through the Internet using an Internet Service Provider).

Preferably, included among the software modules 130 is a database module 170, a verification module 172, a notification module 174 and a communication module 176, that are executed by the processor 110. During execution of the software modules 130, the processor 110 is configured to perform various operations relating to validating the authenticity of communications between users, as will be described in greater detail below. More specifically, during execution of the verification module 172, the processor is configured to assess a level of trust in one or more of the sender and/or recipient(s) of an electronic message sent via the message transmission system 180 and assign a status indicating the assessed trust-level. During execution of the notification module 174, the processor is configured to generate one or more notifications for transmission to one or more of the sending user and receiving user(s) according to the assigned status. During execution of the communication module 176, the processor is configured to transmit the generated notification to the appropriate user computing devices. During execution of the database module 170, the processor is configured to enroll, store and/or update information concerning various users of the system 100 and communications between the various users.

It can also be said that the program code of the software modules 130 and one or more of the non-transitory computer readable storage devices (such as the memory 120 and/or the storage 190) form a computer program product that can be manufactured and/or distributed in accordance with the present disclosure, as is known to those of ordinary skill in the art. It should be understood that in some illustrative embodiments, one or more of the software modules 130 can be downloaded over a network to the storage 190 from another device or system via communication interface 150 for use within the system for validating the authenticity of communications between users 100. In addition, it should be noted that other information and/or data relevant to the operation of the present systems and methods can also be stored on the storage 190, as will be discussed in greater detail below.

A database 185 can also be stored on the storage 190. Database 185 can contain and/or maintain various data items and elements that are utilized throughout the various operations of the system for validating the authenticity of communications between users 100. The information stored in database 185 can include, but is not limited to, information relating to one or more users of the system, including, user identification information, associated electronic addresses (e.g., e-mail address, telephone number, chat ID, social media name, twitter handle, and the like) as well as a level of trust associated with respective users and respective electronic address(es). It should be noted that although users are referred to herein as individuals, users can also refer to entities having associated electronic addresses which are used to transmit electronic messages to other users, as would be understood by those in the art. It should also be noted that, although database 185 is depicted as being configured locally to system server 105, in certain implementations, database 185 and/or various of the data elements stored therein can be located remotely, such as on a remote device or server (not shown), and connected to system server 105 through a network in a manner known to those of ordinary skill in the art.

A communication interface 150 is also operatively connected to the processor 110 and can be any interface that enables communication between the system server 105 and external devices, machines and/or elements. Preferably, the communication interface 150 includes, but is not limited to, a modem, a Network Interface Card (NIC), an integrated network interface, a radio frequency transmitter/receiver (e.g., Bluetooth, cellular, NFC), a satellite communication transmitter/receiver, an infrared port, a USB connection, and/or any other such interfaces for connecting system server 105 to other computing devices and/or communication networks, such as private networks and the Internet. Such connections can include a wired connection or a wireless connection (e.g., using the IEEE 802.11 standard) though it should be understood that communication interface 150 can be practically any interface that enables communication to/from the system server 105.

It should be understood that any of the remote computing devices depicted in FIG. 1 can be in direct communication with one-another or the system server 105, indirect communication with one-another or the system server 105, and/or can be communicatively coordinated with one-another or the system server 105 through a computer network, such as the Internet.

Although the system for validating the authenticity of communications between users 100 is described in reference to a sender device 101 and a recipient device 102 that are respectively associated with a sender and a recipient user, it should be understood that the system is configured to interact with any number of users and user computing devices and that each user can be associated with one or more computing devices.

Figure 3:
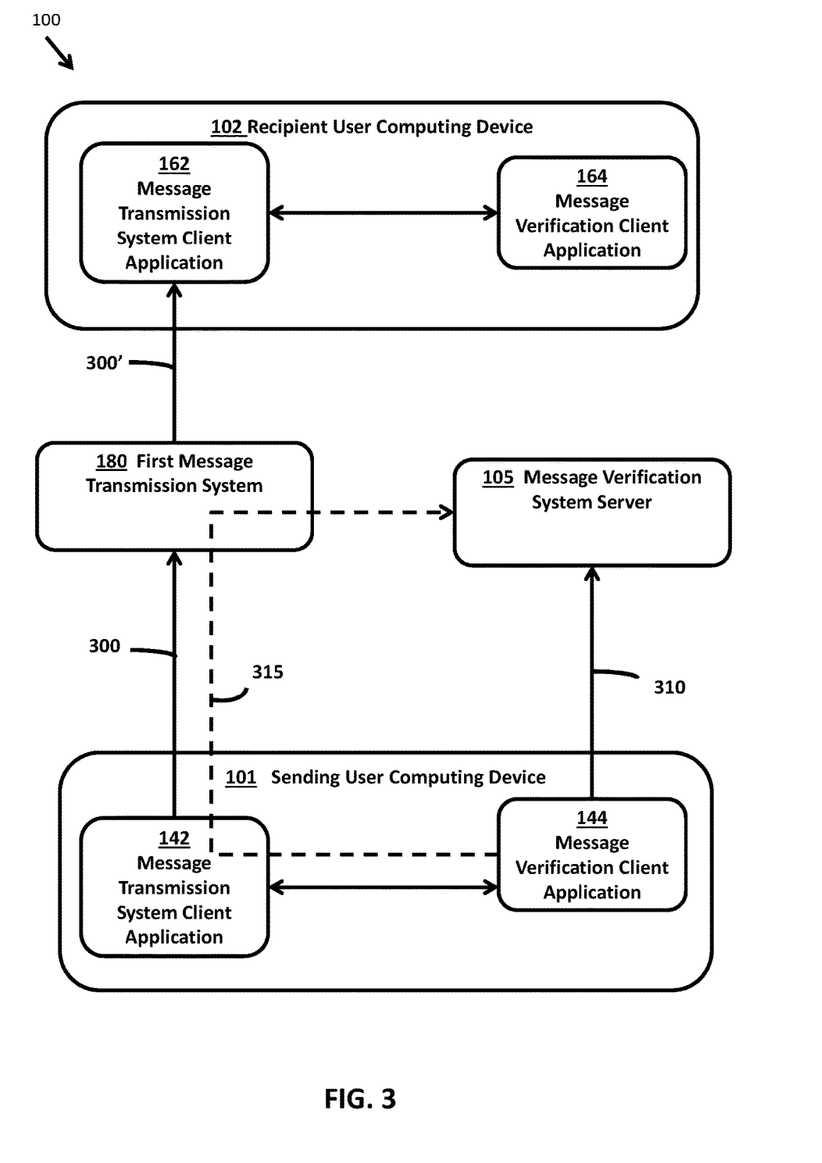
FIG. 3 is a block diagram illustrating an exemplary flow of messages using the system for validating the authenticity of communications between users over a message transmission system in accordance with at least one embodiment disclosed herein.
Figure 4:
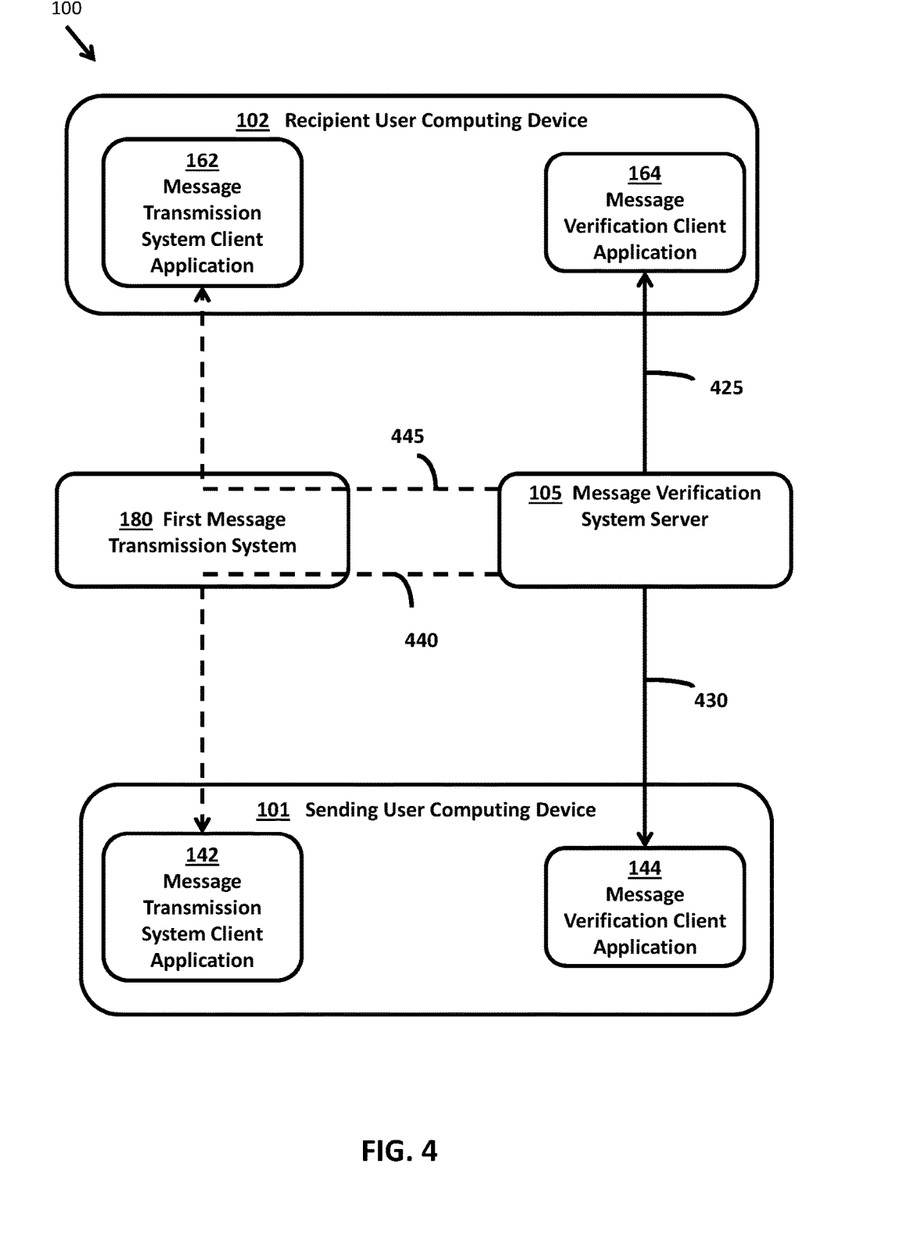
FIG. 4 is a block diagram illustrating an exemplary flow of notifications using the system for validating the authenticity of communications between users over a message transmission system in accordance with at least one embodiment disclosed herein.

The operation of the system for system for validating the authenticity of communications between users 100 and the various elements and components described above will be further appreciated with reference to the method for validating the authenticity of communications between users as described below, in conjunction with FIGS. 2-4.

Preferably, at some point prior to validating the authenticity of communications between users, one or more users are enrolled with the system for validating the authenticity of communications 100. In general, enrollment is performed by collecting user information from respective users using respective user devices (e.g., 101 and 102). The user information can be stored by the system server 105 in the database 185, for example, in respective user profiles that are associated with respective users and/or respective electronic addresses.

More specifically, during registration, the user device, which is configured by executing the message verification client application, can prompt a user to input the user information and provide the user information to the system server. The user information can include information about the user's identity (e.g., name, address, social security number, biometric information etc.) and an electronic address associated with each of the user's messaging accounts being registered.

Enrollment also preferably includes verifying the user's identity and/or messaging account and assigning a verified status, which is also referred to as a "trust-level," to the user and/or a particular associated electronic address. Identity verification provides additional security by determining that the user is who he or she claims to be. Messaging account verification ensures that the registering user has access to the messaging account associated with the registered electronic address. It can be appreciated that such verification steps can be performed by the system server 105, the user devices (e.g., 101 or 102), or a combination of the foregoing.

In some implementations, the system server processor 110, which is configured by executing one or more software modules 130, including, preferably, the database module 170 and communication module 176, can transmit a message to the user account address which prompts the user to confirm receipt of the message thereby ensuring that the user who is registering has access to the particular messaging account. In addition or alternatively, the system server 105 can verify the messaging account by testing user information provided by the user against user information that was previously stored on a secure data store that is accessible to the system server 105. For instance, if the system 100 is implemented for use with an enterprise message transmission system, the user can be verified by testing, say, an account log-in and password provided by the user against stored log-in and password data, or by testing other security secrets. Upon confirming that the user has access to the messaging account associated with the electronic address being registered, the system server 105 can assign a verified status to the particular user's electronic address, for example, a "registered" status, and record the verified status in the user profile.

In some implementations, the user's identity can be further verified. For instance, the user's identity information can be verified using one or more third-party verification services such as the Acxiom Personal Information Verification System by Acxiom Corp. of Little Rock, Ark. Upon confirming the user's access to the messaging account associated with the electronic address and the user's identity, the system server 105 can associate a "trusted" status to the user's electronic address being registered and store an indication of the assigned status to the user profile.

It can be appreciated that the stringency of the identity and account verification can vary depending on the level of trust desired to be associated with the user's various messaging accounts. This can be dictated by a particular implementation of the message verification system 100. For example, some users might desire that their personal e-mail address be assigned a baseline verified status, i.e., a "registered" status. That same user might be required to have a work-related messaging account that is assigned a higher trust-level verified status, e.g., a "trusted" status. As such, the identity verification can range from stringent verification using services such as Axciom to only confirming that the user has access to a particular messaging account. It can be appreciated that alternative methods for verifying a user's identity and corresponding electronic addresses can be employed without departing from the scope of the invention. It can also be appreciated that additional or alternative verified statuses to those described herein can be assigned to user electronic addresses without departing from the scope of the invention. For instance, there can be a hierarchy of user statuses which are reference by the verification module 172 to provide graduated verification.

As noted above, the systems and methods disclosed herein serve to authenticate electronic messages by assessing a trust-level associated with the sender and or the recipient(s) of the message. In some implementations, the system for validating the authenticity of communications 100 can be integrated into an enterprise message transmission system, for instance a bank's internal e-mail system, so as to authenticate e-mails transmitted between employees. It can also be appreciated that the system can be implemented to authenticate messages transmitted between employees and outside parties as well. It can also be appreciated that the systems 100 can be implemented independently so as to authenticate messages transmitted by or between independent users and irrespective of the particular messaging platforms used by respective users (e.g., Microsoft Outlook, G-Mail by Google Inc. of Mountain View, Calif., etc.).

Figure 2:
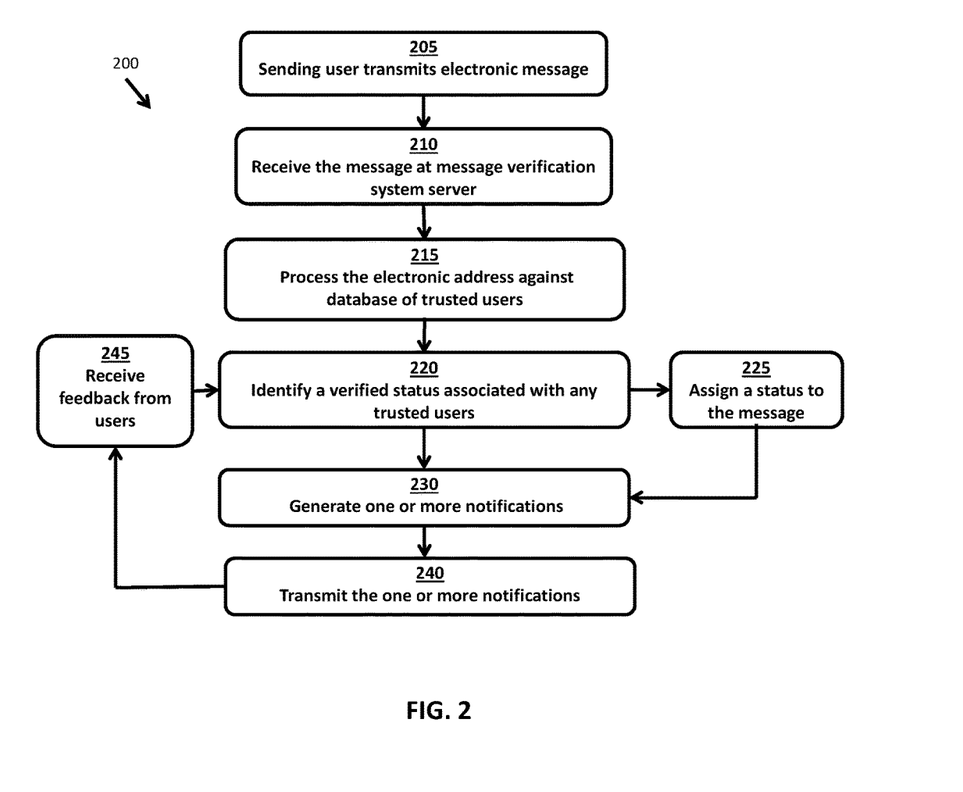
FIG. 2 is a flow diagram illustrating a routine for validating the authenticity of communications between users in accordance with at least one embodiment disclosed herein.

Turning now to FIG. 2, a flow diagram illustrates a routine 200 for validating the authenticity of communications between users over a message transmission system in accordance with at least one embodiment of the invention.

The process begins at step 205 where a sending user transmits an electronic message for delivery to a recipient user. More specifically, the sender, using the sender user computing device 101 executing the message transmission client application 142 (e.g., Outlook or G-Mail), can compose the message and cause the sending user computing device 101 to transmit that message for delivery to the recipient. As would be understood by those in the art, the message can include the sender electronic address and the recipient electronic address as well as additional aspects including information such as a message subject, a message body, a timestamp, metadata, and the like, as found, for instance, in a conventional email message. It would also be understood that the message transmitted from the sender device is routed through the first message transmission system 180 prior to delivery to the recipient using the recipient user computing device 102.

Then, at step 210, the message verification system server 105 receives the message. It can be appreciated that one or more aspects of the message can be received by the system server 105, including, the sender address, the recipient address, as well as information identifying the message (e.g., time stamp, unique identifier, and the like) and at least a portion of the message contents (e.g., subject, body, attachment and the like), or any combination of the foregoing. In addition or alternatively, the system server can receive a copy of the entire message.

Preferably, at least one of the sender or the recipient(s) is enrolled and a message verification client application 144, 164 that is executing on the enrolled user's computing device so as to cause the message to be transmitted to the system server 105. In the case of the sender being enrolled, the message can be provided to the system server upon transmission. In addition or alternatively, in the case of a recipient being enrolled, the message can be received from the recipient device after receipt of the message.

In some implementations, the message can be received by the system server 105 directly from the sending user device 101. In addition or alternatively, the message can be received indirectly from via first message transmission system 180. Transmission of the message to the system server 105 via the message transmission system 180 can be caused by operation of the sender message verification client application or the recipient message verification client application depending on which of the users are enrolled.

For instance, in the case of the sender being enrolled with the system, the message verification client application 144, which is executing on the sender device 101 in conjunction with the message transmission client application 142, can automatically identify relevant aspects of the message that is being transmitted via the message transmission system 180 and can transmit those relevant aspects to the system server 105. Turning briefly to FIG. 3, FIG. 3 is a block diagram illustrating the data flow of the message transmitted between the sending user device 101, the first message transmission system 180, the system server 105 and the recipient user device 102 in accordance with the disclosed embodiments. As shown in FIG. 3, the transmission of the message from the sender message client application 142 to the message transmission system 180 illustrated by arrow 300, and transmission of the message by the message verification client application 144 to the system server 105 is illustrated by arrow 310.

In addition or alternatively, the message verification client application 144 can cause the message transmission client application 142 to transmit a copy of the message to the system server 105 via the first message transmission system 180. For instance, the message verification client application 144 can cause the message transmission client application 142 to address the system server as a "BCC" recipient of an e-mail message such that the message is transmitted to the system server by operation of the message transmission system 180. By way of further example, in the case of a text message, the message verification client application 144 can cause the sender message transmission client application 142 (e.g., text messaging application) to automatically transmit the message to a telephone number/text message address associated with the system server 105. As shown in FIG. 3, the transmission of the message from the first message transmission client application 142 to the system server via the first message transmission system 180 is illustrated by arrows 310 and 315.

In addition, the message verification client application can execute rules that define specific circumstances for providing the message to the system server 105. The rules can cause messages having a prescribed message priority or certain message aspects, say, a "high" message priority assigned by the sending user (or the recipient upon receipt), to automatically be transmitted to the system server 105 for processing. In addition, the one or more aspects of the message that are provided to the system server can be based on the priorities or aspects of the message. Similarly, messages can be transmitted to the system server and processed based on specific user input and instructions.

The foregoing exemplary steps for forwarding the message by the sending user computing device to the system server 105 are provided as non-limiting examples. It can be appreciated that the recipient user computing device 102 executing the message verification client application 164 can be configured to cause the message to be provided to the system server 105 upon receipt of the message, for example in the case that the sending user is not an enrolled user. Moreover, alternative steps for collecting and forwarding the relevant aspects of the message to the system server can be implemented depending on the particular type of message (e.g., e-mail, text, electronic chat, etc.) and the particular message transmission platforms used to communicate by respective users (e.g., native application, browser based application, cloud based system, and the like) without departing from the scope of the disclosed embodiments.

Then at step 215, upon receipt of the message (or portions thereof) the system server processor 110, which is configured by executing one or more software modules 130, including, preferably, the database module 170 and the verification module 172, can process the sender address and/or the recipient address against the database of enrolled user profiles to verify whether the sender and/or the recipient are among a set of trusted users.

This can include, testing the sender address against the database to determine whether the sender address matches a sender address stored in the database in association with a user profile.

If the sender address is matched to a user profile, then at step 220, the system server can identify a trust-level that is associated with the sender address. As noted above, a user electronic address can be assigned a verified status during enrollment, for example, "registered" and "trusted." Accordingly, the system server can identify from the user profile whether the sender address has a particular trust-level. If the sender address is not matched, the system server can assign a status indicating that the sender address is not associated with an enrolled user, say, by assigning an "untrusted" status. In some implementations, if the sender addresses is not matched, the system server can refrain from assigning any status, such that only users having an identified level of trust are assigned a status.

Although steps 215 and 220 are described in relation to testing whether the sending user is a trusted user, in addition or alternatively, steps 215 and 220 can be performed using one or more of the recipient address so as to identify and assign any verified status for one or more recipients of the message.

The routine 200 can also include step 225, in which the system server 105, which is configured by executing one or more software modules 130, including, preferably, the database module 170 and the verification module 172, can analyze the verified status assigned to the sender and/or the recipient, to determine an overall status of the message. It can be appreciated that the message status is representative of the verified status assigned to the sender and/or one or more recipients. For example, if the sender has been identified as having a trusted status, and one or more of the recipients of the message have not been identified as having a trusted status, the message can be assigned a unique status reflecting this. Accordingly, the parties to the message can be notified of not only the status of one or more of the users individually, but also the message as a whole, as further described herein, thereby enabling the parties to take appropriate action in view of the possibility that the message could be untrustworthy.

In addition, the system server 105 can also determine the message status by applying one or more rules stored in one of the databases to the assigned sender and recipient status. The rules can specify requisite sender and/or recipient statuses that correspond to one or more status levels for the message. For example, the rules can provide that, if both the sender and the recipient are at least "registered users," the message can be assigned a message status signifying a lower trust-level. By way of further example, the rules can provide that, a message can be assigned a status signifying a higher trust-level if both sender and recipient have been assigned the "trusted" status. In addition or alternatively, the message status can simply be comprised of one or more of the sender and recipient status. For instance, the message status can be the same as the sending user's status.

In some implementations, the system server 105 can be configured to group registered users in association with one-another so as to create sets of trusted users. This association process can be performed during enrollment. The grouping of users can also be based on ongoing user activity or prescribed settings defined by users. For example, users that work for the same company and have the same e-mail extension (e.g., user@company.com) can be grouped together to define a trusted group. By way of further example, friends that commonly correspond with one another can be grouped together as a trusted group based on frequency of correspondence between the users. It can be appreciated that a variety of methods can be used to group, link or otherwise associate enrolled users and their respective electronic addresses.

Accordingly, the system server 105 can be configured to assign a status to the message based on whether the sender and/or recipients are part of one or more trusted groups or are otherwise associated and according to rules. For example, the rules can specify that a message should be assigned a low trust-level status if not all of the parties are "trusted" but all of the parties are at least "registered" and are members of the same user group. By way of further example the rules can specify that a message should be assigned a medium trust-level status if all parties have been assigned a "trusted" status. By way of further example the message can be assigned a highest trust-level status if all parties have been assigned a "trusted" status are all part of the same sub-group of users associated with a particular company.

It can be appreciated that the sets of enrolled users and the rules can similarly be applied by the system server 105 to individually assign a status to the sender and/or the recipient of the message (e.g., at steps 215-225) and generate appropriate notifications for transmission to the users, as further described herein.

In some implementations, user profiles can include a plurality of trusted locations associated with respective trusted users. In addition, the communication provided to the system server 105 can include at least location data concerning a present location of one or more of the sending user computing device 101 or the recipient user computing device 102. The rules can define that respective users can be assigned a verified status if the registered locations associated with the respective user's user profile corresponds to the present location identified in the message. Accordingly, the step of verifying that the sending user is among a particular set of trusted users can include testing the present location data included in the communication for a match with one or more trusted locations stored in the database in association with a respective user's electronic address. Other security tests of message aspects against user information stored in respective user profiles can be implemented during verification of the parties to a message, as would be understood by those in the art.

Then at step 230, one or more notifications are generated for transmission to the sender and/or the recipient of the message. The notifications can be generated by the system server 105, which is configured by executing one or more software modules 130, including, preferably, the notification module 174, based on one or more of the statuses determined at steps 215-225. It can also be appreciated that notifications can also be transmitted to non-parties to the message, for example, a company IT administrator or security agent, so as to notify the third-party of a potential security breach.

The system server can generate various types of notifications based on one or more rules stored in one of the databases that define scenarios for notifying certain parties to the message and what information is conveyed in the notification. Whether a particular type of notification is provided to a particular user can depend on the sender status, recipient status, and/or the message status.

In general, notifications can be provided to enrolled senders can be provided for purposes of auditing the use of the sender's electronic address that was used to transmit the message. For example. The notifications can be provided to the recipient so as to inform the recipient as to the whether the sender of the message has been verified and thus provides the recipient with a measure of authenticity for the message. Similarly, notifications to the sender can inform the sender as to a verification level associated with the recipient. It can also be appreciated that notifications can be provided to users who are not enrolled, whether they are a sender or recipient, so as to solicit an action by the particular user. For example, the notification can prompt the particular user to enroll with the system and be assigned a verified status for future communication. Similarly, notifications can also be transmitted to enrolled uses so as to elicit some sort of response. For instance, senders can be prompted to confirm transmission of the message or recipients can be prompted to confirm receipt of the message.

In some implementations, a first notification type can be generated for transmission to at least the recipient user (i.e., the recipient of the message) in response to the sending user being assigned a status that is "trusted" or "registered." Providing the sender status to the recipient thereby indicates to the recipient that the system has identified that the sender is enrolled with the system and therefore is not "untrusted."

The first type of notification can be provided to the recipient irrespective of whether the recipient is enrolled with the system. However, in some implementations, if the recipient is not enrolled, the notification can further prompt the recipient to take a certain action, such as, enroll with the system or input additional information as further described herein.

In some implementations, a second notification type can be generated for transmission to at least the sending user (i.e., the sender of the message) in response to the recipient user being assigned a status that is "trusted" or "registered." Providing the recipient verified status to the sender thereby indicates to the sender that the system has determined that the recipient is enrolled with the system and therefore is not "untrusted."

In some implementations, a third notification type can be generated for transmission to at least the recipient user in response to both the sender and the recipient user being assigned a status that is "trusted" or "registered." Providing the recipient verified status to the sender and the recipient thereby indicates that the system has identified that both parties are, at least, enrolled with the system and therefore are not "untrusted."

In some implementations, a fourth notification type can be generated for transmission to at least the recipient user in response to a determination that recipient user is not enrolled. In particular, the fourth notification type can be generated in response to the recipient user having been assigned a status indicating the recipient is "untrusted" or, alternatively, not having been assigned a status at all. Accordingly, the notification can prompt the user to enroll with the system.

Any of the foregoing notifications can also include at least one aspect of the communication, say, the electronic address of one or more of the sender or recipient, an associated name, the subject of the message, a portion of the message body, a time stamp and the like, thereby providing information that is useable by the sender or recipient as a reference to the message originally transmitted or received.

The foregoing notifications are intended to be exemplary and non-limiting as notifications indicating the status of the parties and/or the message can be transmitted to the sender or the recipient users under a variety of circumstances defined by business rules. The business rules defining the various scenarios for providing certain notifications can be defined by users individually, as well as groups of users depending on the requirements of the group.

Then at step 235, the system server 105, which is configured by executing one or more software modules 130, including, preferably, the notification module 174, and the communication module 174, can transmit the one or more notifications to the appropriate users.

As noted above, the various types of notifications can be generated at step 230 can be transmitted from the system server 105 to the particular user so as to provide an indication of status of one or more of the sender, the recipient or the message. In addition or alternatively, the notifications can be configured to elicit an action from the particular user.

If the user to be notified is an enrolled user, the notification can be transmitted for presentation to a respective user by the message verification client application (e.g., 144 and 164) executing on a respective user computing device (e.g., 101 and 102). Turning briefly to FIG. 4, FIG. 4 is a block diagram illustrating an exemplary data flow of the notifications that can be transmitted by the system server 105 to the sending user computing device 101 and/or the recipient user computing device 102 in accordance with the disclosed embodiments. As shown in FIG. 4, the notifications transmitted by the system server 105 to the recipient message verification client application 164 and the sender message verification client application 144 are displayed as arrows 425 and 430 respectively.

The message verification client application executing on a respective user computing device can be configured to present the notification directly to a respective user and independent of the original message. In addition or alternatively, the message verification client application can cause the message transmission client application to provide the notification in association with the message. For example, the message verification client application can cause the message transmission client application to display an icon, or other information indicating the one or more the statuses assigned at steps 220-225, within the message or in association with the message such that the notification is easily seen by respective users in the normal course of viewing the message.

In addition or alternatively, for example, if a particular user to be notified is not an enrolled user, the notification can be transmitted to the particular user's electronic address, as determined from the message, via the first message transmission system 180. As shown in FIG. 4, the notifications transmitted to the sender and the recipient via the first message transmission system 180 are depicted as arrows 440 and 445 respectively. The notification can prompt the recipient to take a certain action, such as, inviting the user to enroll with the system or input additional information.

As noted above, notifications transmitted to respective users can be configured to prompt a response from the user. This response can include, for example and without limitation, confirming whether the sender transmitted the message, whether the recipient received the message, or whether the sender and/or recipient would like to enroll. Accordingly, process 200 can include step 240, in which user responses to such notifications are received and processed by the system server 105 for further action. Further action by the system server can include, repeating the steps of verifying one or more of the sender, recipient and the message, generating one or more notifications, and transmitting the generated one or more notifications as described in relation to steps 215-235.

For instance, prior to transmitting any notification to the recipient, the system server 105 can transmit a notification to a sending user using the message verification application to prompt the sending user to confirm that the sending user caused the communication to be sent. The user confirmation can be received by the sender user computing device 101 executing the message verification client application 144 and provided to the system server 105. Based on the sending user's confirmation the system server generate the first type of notification for transmission to the recipient indicating at least that sending user was assigned the sender verified status. In addition, the first notification can also indicate that the sending user also independently confirmed transmission of the message.

Similarly, the system server 105 can transmit a notification for presentation to a recipient thereby prompting the recipient to confirm that the message was received. The user confirmation can be received by the system server and, based on the recipient's confirmation, the system server can generate, say, the second type of notification for transmission to the sending user thereafter.

It can also be appreciated that, the system server 105 can be configured to generate and transmit multiple notifications to users based on the processing of responses received from users. For instance, if a sender who was not enrolled at the time of transmitting the message subsequently enrolls in response to a notification received from the system server 105, the system server can re-assess the sending user's verified status and generate and transmit a new notification indicating to the recipient that the sending user has been assigned the verified status.

Concluding Remarks

Accordingly it can be appreciated that the system for validating the authenticity of communications between users 100, which includes the system server 105 in conjunction with the remote user computing devices 101 and 102 and message transmission system 180 distributed across a network, is configured to analyze and validate verification status associated with parties to a message and assess the authenticity of the message and proactively notify users as to the authenticity of the message in an efficient and effective manner thereby aiding in the efficient prevention of fraud via the distributed network of computing devices and independence of the message verification system server from the message transmission system.

At this juncture, it should be noted that although much of the foregoing description has been directed to systems and methods for validating the authenticity of communications between users over a message transmission system, the systems and methods disclosed herein can be similarly deployed and/or implemented in scenarios, situations, and settings far beyond the referenced scenarios.

It should be appreciated that more or fewer operations can be performed than shown in the figures and described. These operations can also be performed in a different order than those described. It is to be understood that like numerals in the drawings represent like elements through the several figures, and that not all components and/or steps described and illustrated with reference to the figures are required for all embodiments or arrangements.

Thus, illustrative embodiments and arrangements of the present systems and methods provide a computer implemented method, computer system, and computer program product for validating the authenticity of communications between users. The flowchart and block diagrams in the figures illustrate the architecture, functionality, and operation of possible implementations of systems, methods and computer program products according to various embodiments and arrangements. In this regard, each block in the flowchart or block diagrams can represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

The subject matter described above is provided by way of illustration only and should not be construed as limiting. Various modifications and changes can be made to the subject matter described herein without following the example embodiments and applications illustrated and described, and without departing from the true spirit and scope of the present disclosure, which is set forth in the following claims.

What is claimed is:

1. A method for validating the authenticity of communications between users sent over a first message transmission system, each communication including a message, a sender electronic address, and a recipient electronic address, wherein each communication is sent from a sending computing device associated with a sending user and is addressed to the recipient electronic address of a recipient user, the method comprising:

providing a message verification application independent of the first message transmission system to at least the sending user and the recipient user, the message verification application being executable by respective computing devices associated with each of the sending user and the recipient user;

receiving, at a centralized computing device over a network connection from the message verification application, a copy of a communication transmitted via the first message transmission system, the centralized computing device being independent of the first message transmission system and including a storage medium having instructions stored therein and a processor configured by executing the instructions;

verifying, using the code executing in a processor of the centralized computing device and independent of the message transmission system, whether the sending user, the recipient user, or both are among a particular set of trusted users by:

testing the sender electronic address, the recipient electronic address, or both for a match with at least one of a plurality of electronic addresses stored in a database of electronic addresses associated with respective trusted users, and assigning a verified status to the sending user, the recipient user, or both in response to the testing step resulting in the match;

generating, using further code executing in the processor, one or more notifications for transmission via the message verification application, wherein the one or more notifications comprise one or more notification types including:

a first type that is generated for transmission to at least the recipient user in response to the sending user being assigned the verified status;
a second type that is generated for transmission to at least the sending user in response to the recipient user being assigned the verified status;
a third type that is generated for transmission to at least the recipient user in response to the sending user and the recipient user both being assigned the verified status, wherein the third type of notification identifies at least the sending user being assigned the verified status; and
a fourth type that is generated for transmission to at least the recipient user in response to the verified status not being assigned to the recipient user; and
transmitting the one or more notifications from the centralized computing device to at least one of the respective computing devices associated with the sending user, the recipient user, or both.

2. The method of claim 1, wherein the message verification application includes code configured to cause the first message transmission system to direct the copy of the communication to the centralized computing device.

3. The method of claim 2, wherein the message verification application comprises a plug-in application including code configured to cause the first message transmission system to automatically direct the copy of the communication to the centralized computing device.

4. The method of claim 2, wherein the code comprises a rule configured to execute in the first transmission system and thereby direct the copy of the communication from the first message transmission system to the centralized computing device.

5. The method of claim 4, wherein the rule is further configured to direct the copy of the communication to the centralized computing device as a function of a priority assigned to the communication by the sending user.

6. The method of claim 1, wherein the plurality of electronic addresses stored in the database of electronic addresses are associated with respective trusted users and respective trust-levels among a plurality of possible trust-levels.

7. The method of claim 6, wherein the verified status is assigned according to the respective trust-level associated with the match with the at least one electronic addresses stored in the database.

8. The method of claim 1, wherein the message verification application is configured to associate the one or more notifications with the communication of the first message transmission system for display to the one or more of the sending user or the recipient user.

9. The method of claim 1, wherein the communication includes a plurality of recipient electronic addresses associated with a plurality of recipient users.

10. The method of claim 1, wherein the database includes a plurality of sets of trusted users.

11. The method of claim 1, wherein the communication includes at least location data concerning a present location of the sending computing device, and wherein the database includes a plurality of trusted locations associated with respective trusted users, and wherein the step of verifying that the sending user is among the particular set of trusted users further comprises:
testing the location data included in the communication for a match with one or more trusted locations stored in the database in association with the sender electronic address.

12. The method of claim 1, further comprising:
using the message verification application to prompt the sending user to confirm that the sending user caused the communication to be sent; and
receiving the confirmation at the centralized computing device,
wherein the first type of notification is generated in response to confirmation being received from the sending user at the centralized computing device in addition to the sending user being assigned the sender verified status.

13. The method of claim 1, further comprising:
using the message verification application to prompt the recipient user to confirm that the receiving user received the communication; and
receiving the confirmation at the centralized computing device,
wherein the second type of notification is generated in response to confirmation being received from the recipient user at the centralized computing device in addition to the recipient user being assigned the recipient verified status.

14. The method of claim 1, wherein the one or more notifications comprise information that identifies at least one aspect of the communication.

15. The method of claim 1, wherein the one or more notifications comprise information that identifies at least the sending user, the recipient user or both.

16. The method of claim 15, wherein the first type of notification identifies as the at least one aspect of the communication at least a portion of the message included in the communication.

17. The method of claim 1, wherein the first type of notification provides at least an indication that the sender has been assigned the verified status.

18. The method of claim 1, wherein the second type of notification provides at least an indication that the recipient has been assigned the verified status.

19. The method of claim 1, wherein the third type of notification further identifies the sending user, the recipient user, and at least a portion of the message included in the communication.

20. The method of claim 13, wherein the third type of notification further provides at least an indication that the sender has been assigned the verified status.

21. The method of claim 1, wherein the fourth type of notification is transmitted to the recipient electronic address and provides an indication that the verified status has not been assigned to the recipient user and is configured to prompt the recipient user to be verified.

22. The method of claim 21, further comprising:
in the event of transmitting the fourth type of notification, receiving the user verification information at the centralized computing device.

23. The method of claim 1, wherein the one or more notifications further comprises a fifth type that is generated for transmission to at least the recipient user in response to the verified status not being assigned to the sending user.

24. The method of claim 1, wherein the one or more notifications further comprises a sixth type that is generated for transmission to at least the sending user in response to the verified status not being assigned to the sending user and is configured to prompt the sending user to be verified.

25. The method of claim 1, wherein the one or more notification causes the first message transmission system to present the one or more notification to the at least one of the respective computing devices in association with the communication.

26. The method of claim 1, wherein the one or more notification causes the message verification application to present the one or more notifications to the sending user, the recipient user, or both in association with the communication.

27. The method of claim 26, wherein the first message transmission system comprises a message transmission client application accessible by the at least one of the respective computing devices, and wherein the messaging message verification application causes the message transmission client application to provide the one or more notifications to the sending user, the recipient user or both.

28. The method of claim 1, wherein the message verification application presents the one or more notifications to the sending user, the recipient user, or both during presentation of the communication by the first transmission system.

* * * * *